United States Patent Office 3,230,575
Patented Jan. 25, 1966

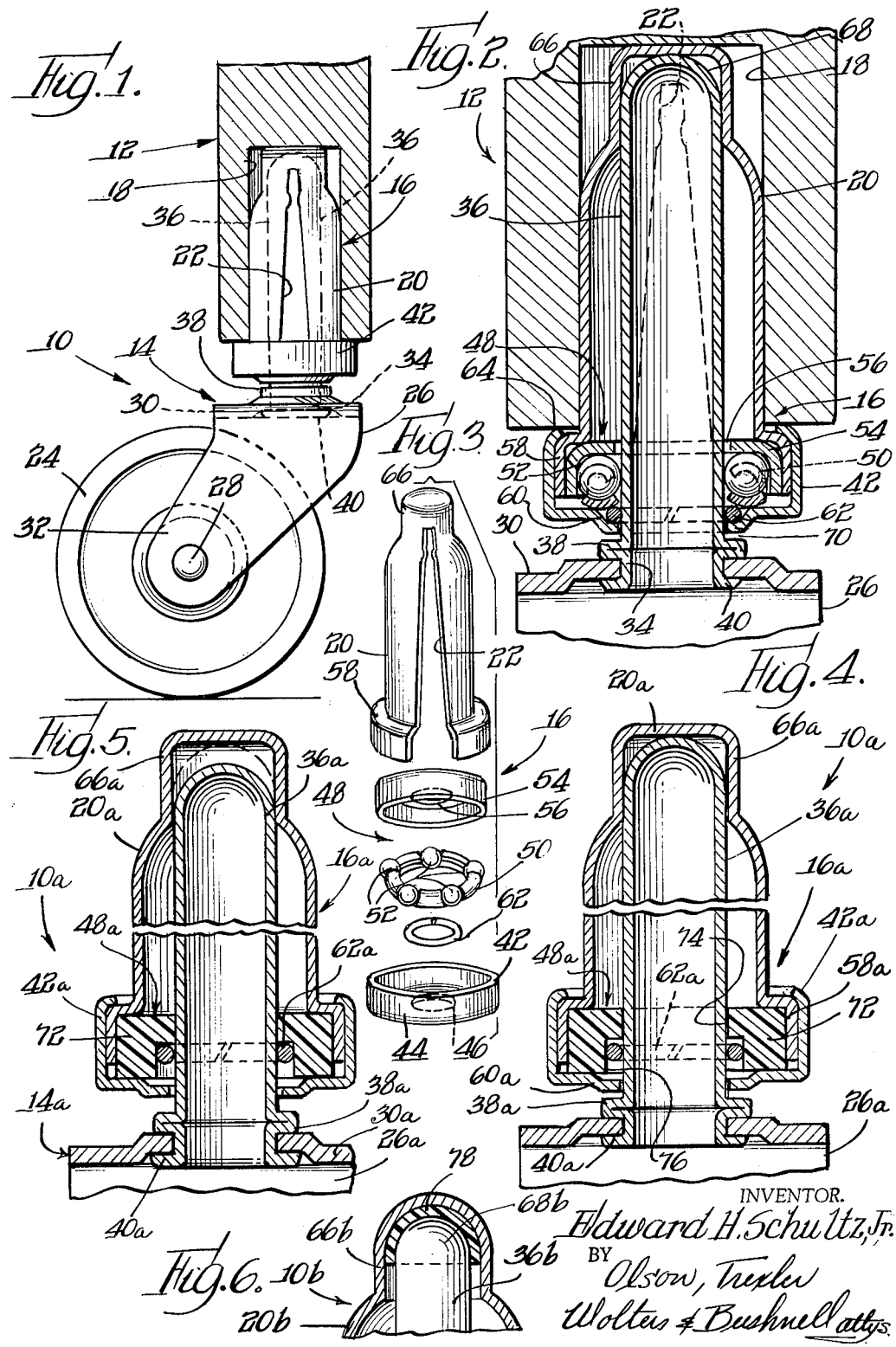

1

3,230,575
CASTER ARRANGEMENT FOR ROLLABLY SUPPORTING FURNITURE AND THE LIKE
Edward H. Schultz, Jr., Chicago, Ill., assignor to Nagel-Chase Manufacturing Company, Chicago, Ill., a corporation of Illinois
Filed Apr. 1, 1964, Ser. No. 356,559
4 Claims. (Cl. 16—43)

This invention relates generally to casters for supporting furniture, home appliances and analogous devices.

Caster arrangements of the type used in rollably supporting desk chairs and other furniture pieces conventionally employ a socket which is driven into a bore previously drilled into the furniture piece. This socket receives the upright pintle of the caster proper. In these prior art arrangements, at least one race containing a suitable number of ball bearings is incorporated in the caster proper to lessen the normal resistance of turning the caster yoke with respect to the socket. The lateral thrust loads which result from the horizontal component of force impressed on the furniture piece for relocating it act to bind the caster pintle against the wall of the socket adjacent the bottom end thereof. Thus, the pintle does not ordinarily rotate within the socket; but rather, the caster yoke rotates relative to the pintle as facilitated by the ball bearings. Accordingly, it has heretofore been thought necessary to arrange the antifriction bearing to act between the pintle and the yoke of the caster unit. However, the wheel which is journaled on the caster yoke defines a wearing surface and is generally exposed to both abuse and destructive blows. As a consequence, this wheel has a relatively short life; and when the caster proper is replaced because of a worn or damaged wheel, an expensive bearing is discarded with the old wheel.

An important object of the present invention is, therefore, to provide a rollable support arrangement for furniture and analogous devices which arrangement does not require discarding an expensive bearing when a floor-engaging wheel is replaced.

A more general object of the invention is to provide a new and improved rollable support arrangement for furniture and analogous devices.

Another object of the invention is to provide a rollable support arrangement in which the caster pintle is free to rotate relative to its receiving socket.

Still another object of the invention is to provide a rollable support arrangement which is smooth and quiet in operation.

And still another object of the invention is to provide a rollable support arrangement which is constructed to prevent accidental disassembly of the socket and caster units.

Yet another object of the invention is to provide a rollable support arrangement that accommodates unevenness in an underlying floor.

A further object of the invention is to provide a novel socket unit for coupling a simple caster to a device which is to be rollably supported.

These and other objects and features of the invention will become more apparent upon a consideration of the following descriptions.

A support arrangement in accord with the invention includes a simple caster unit having a frame or yoke and a pintle rigidly upstanding from the frame. In addition, the support arrangement of the invention includes a socket unit that is dimensioned to receive the pintle slidably and rotatably and that incorporates an antifriction bearing mounted adjacent its bottom end to contact

2 the pintle and bear lateral thrust loads imposed on the caster unit.

The invention, both to its construction and mode of operation will be better understood by reference to the following disclosure and drawing forming a part thereof, wherein:

FIG. 1 is a side elevational view of a rollable support arrangement constructed in compliance with the invention and shown supporting one leg of a furniture piece, the leg of the furniture piece being illustrated in cross-section to reveal the socket unit;

FIG. 2 is an enlarged, vertical sectional view showing the socket unit and the upper end of the caster unit of the rollable support arrangement of FIG. 1;

FIG. 3 is an exploded perspective view of the socket unit of FIG. 1;

FIG. 4 is a vertical sectional view similar to the showing of FIG. 2 but illustrating a modified embodiment of the invention;

FIG. 5 is another sectional view of the embodiment of FIG. 4 but illustrating axial separation of the socket and caster units for accommodating unevenness in the underlying floor without rattle of the parts; and FIG. 6 is a fragmentary view of a still further modified embodiment of the invention incorporating an antifriction bearing between the upper end of the caster pintle and the cooperating, inverted cup-like portion of the socket.

Referring now in detail to the drawing, specifically to FIG. 1, a rollable support arrangement indicated generally by the numeral 10 is shown supporting one leg 12 of a furniture piece. The rollable support arrangement 10 includes an understructure or caster unit 14 and a socket or coupling unit 16, the socket unit 16 being inserted in an axial bore 18 that is fashioned in the furniture leg 12. The socket unit 16 incorporates a tubular socket member 20 which is fashioned with a pair of diametrically disposed, axially elongated slots 22. The slots 22 lend a certain amount of radial resiliency to the socket member 20 in order that the socket member may be collapsed slightly upon insertion in an undersized bore, the resiliency of the socket member promoting a gripped engagement between the lateral sides of the socket member and the confronting walls of such a bore.

Continuing with reference to FIG. 1, the caster unit 14 is shown to include a floor-engaging wheel 24 which is journaled to a frame or yoke 26 by means of an axle 28. The frame 26 is of inverted U-shape and includes a base 30 and depending parallel legs 32, the shaft 28 being mounted to span the space between the legs 32. The base 30 of the yoke 26 is perforated with an aperture 34, and the caster unit includes a pintle 36 that is rigidly mounted to the frame 26 in upstanding relationship. Specifically, the pintle 36 is fashioned with a medial flange 38 that defines a radial enlargement for abutting the upper surface of the base 30 of frame 26. The pintle 36 also is provided with a lower end portion that passes through the aperture 34 to be peened over forming a head 40, head 40 opposing the flange 38 in mounting the pintle to the yoke 26. Advantageously, the pintle 36 is of hollow character as is well shown in FIG. 2.

Referring now to FIGS. 2 and 3, the socket unit 16 is seen to comprise a shallow tubular base 42 which is closed by a bottom 44 and which is dimensioned to receive the lower end of the socket member 20 telescopingly, the bottom of base 42 being perforated with a central aperture 46 for passing the pintle 36 into the socket member 20. In compliance with an important feature of the invention, the socket unit 16 includes an antifriction bearing; and in the embodiment of FIGS. 1–3, an antifriction bearing 48 comprises a ball bearing arrangement. Specifically, a retainer 50 is fabricated with arcuately spaced pockets for both receiving a suitable number of ball bearings 52 and retaining the same. These pockets preserve the arcuate and radial position of the ball bearings while permitting free rotation thereof about their respective centers. A suitably hardened upper race member 54 is positioned over the assembled retainer and ball bearings, and the race member 54 is fashioned with a central aperture 56 which is dimensioned to pass the pintle 36 freely.

In order to accommodate the antifriction bearing 48, the socket member 20 is fashioned with a radially enlarged collar portion 58 at its lower end and the base 42 is cooperatively dimensioned. The radial enlargement which is defined by the collar portion 58 and the base 42 establishes a stop shoulder which abuts the lower end of furniture leg 12 outwardly of the margins of bore 18 as is shown in FIGS. 1 and 2. Moreover, the collar portion 58 and the base 42 cooperate to position the antifriction bearing 48 in encircling relationship relative to the pintle 36 adjacent the bottom end of the socket unit 16. There, the ball bearings 52 are situated to contact the sidewall of the pintle and bear lateral thrust loads imposed on the caster unit 14. In compliance with another feature of the invention, radially resilient means are mounted in the socket unit 16 with limited axial movement relative thereto and for exposure to the pintle 36 resiliently to grip a peripheral portion thereof whereby to prevent accidental extraction of the pintle from the socket unit. Specifically, the base 42 is fashioned with a depending boss 60, as is shown in FIG. 2, and a discontinuous annular spring member 62 is situated in the cavity defined by the boss 60 generally beneath the retainer 50.

In assembly of the socket unit 16, the spring washer 62 is located in the hollow formed by boss 60 whereupon the retainer 50, together with the ball bearings 52 carried thereby, is disposed over the spring member. Next, the upper race member 54 is dropped over the retainer 50, the collar portion 58 of socket member 20 is slipped over the upper race member, and the upper edge of the base 42 is inwardly formed over to create an annular lip 64 which serves to hold the various components in assembled condition. As will be recognized, the depth of the boss 60 establishes the permissible movement of the spring member 62 in a direction axially of both the socket member 20 and the pintle 36.

In compliance with another feature of the invention, axial thrust loads are impressed on the caster unit 14 exclusively at the top end of the pintle 36. For this purpose, the upper end of the socket member 20 is fashioned with an inverted cup-like formation 66 of rectangular section; and the top of the pintle 36 is correspondingly provided in spherical shape as is indicated at 68 in FIG. 2 whereby to establish point contact with the top of formation 66. In addition, the inverted cup-like upper end of the socket member 20 is selected to be of sufficient depth to present a cylindrical wall for engagement with the cylindrical wall of pintle 36 immediately beneath the spherical top end thereof. These cooperating cylindrical wall portions coact with the antifriction bearing 48 in maintaining the pintle in upright condition so that the apex of spherical top of the pintle bears against the center of the formation 66, thus maintaining vertical loading on the geometric longitudinal axis of the pintle. In addition, the pintle 36 is selected to take an axial length greater than the corresponding dimension of the socket unit 16 so as to establish a space 70 between the boss 60 and the medial flange 38 of the pintle.

Operation of the rollable support arrangement 10 will be apparent from the foregoing descriptions.

While a particular embodiment of the invention has been thus far shown and described, it should be understood, of course, that the invention is not limited thereto since many modifications may be made. Therefore and in order to enhance the understanding of the invention, two modified embodiments of the invention are shown respectively in FIGS. 4–5 and FIG. 6. Since these latter embodiments include certain elements which are similar to elements found in the embodiment of FIGS. 1–3, like numerals have been used to designate like parts with the suffix letter $a$ being employed to distinguish those elements associated with the embodiment of FIGS. 4 and 5 and with the suffix letter $b$ being utilized to differentiate those elements associated with the embodiment of FIG. 6.

The rollable support arrangement 10a of FIGS. 4 and 5 is particularly characterized by the provision of antifriction bearing 48a in the form of an annular body 72 of fused resin of a type having a low coefficient of friction. While a fluorocarbon resin, such as for example polytetrafluoroethylene, is advantageously employed in fabricating the bearing 48a, polyamide resins, such as for example nylon, have also proved useful although to a lesser degree. The resinous body 72 is provided with a central bore 74 which contactingly receives the pintle 36a with a circular band of area contact therebetween. The resinous body 72, being soft and cushiony as compared with a metal part, eliminates rattle and other noise which would otherwise be anticipated in an exclusively metallic construction. In accordance with another feature of the embodiment of FIGS. 4 and 5, the resinous body 72 is fashioned with a counterbore 76 which opens through the lower end of the resinous body and which penetrates the body 72 by a distance equal to a multiple of the thickness of the spring member 62a that is employed in retaining the pintle 36a in the socket member 20a. The depth that the counterbore 76 pentrates into the resinous body permits appreciable free axial movement of the pintle relative to the socket member 20a for accommodating variations in the underlying floor. This free axial movement of the pintle promotes quiet operation since the spring member 62a grips the pintle and moves in contact with the resinous body 72. The amount of axial freedom which is permitted the pintle 36, and therefore the caster unit 14a relative to the socket unit 16a, is illustrated in FIG. 5 by comparing the solid line showing and the broken line showing.

The rollable support arrangement 10b of FIG. 6 is characterized by the provision of an axial thrust bearing to act between the top end of pintle 36b and the confronting portion of the socket member 20b. Specifically, a hollow, domed element 78 is situated in the inverted cup-like upper end 66b of the socket member. Advantageously, the element 78 is fabricated from an antifriction material such as one of the fluorocarbon resins. The domed element 78 is fashioned with a generally spherical undersurface for matably receiving the spherical top end of the pintle 36b. Since the domed element 78 is fabricated from a resinous material, it serves as a noise damper as well as a bearing.

From the foregoing descriptions, it will be apparent that the caster unit 10 can be disassembled from the socket unit 16 by forcibly extracting the pintle from its gripped engagement by the spring member 62. Because lateral thrust is borne by an antifriction bearing in the socket unit, replacement of the caster unit, as to replace a damaged caster wheel, does not require discarding of an explosive bearing. Moreover, the rollable support arrangement of the invention will be recognized as separating the means for bearing the axial and the lateral thrust loads. The separation of the load bearing function permits use of the antifriction bearing which has been generally denoted by the reference numeral 48 exclusively for accepting the lateral thrust loads. In addition, since the antifriction bearing 48 accepts the lateral thrust loads adjacent the bottom of the socket unit where binding customarily occurs, the caster pintle is free to rotate relative to its receiving socket.

These specific examples herein shown and described are to be considered to be primarily illustrative. Various changes beyond those described will, no doubt, occur to those skilled in the art; and all such changes are to be understood as forming a part of this invention insofar as they fall within the spirit and scope of the appended claims.

I claim:

1. A rollable support arrangement comprising: understructure means including a frame, floor-engaging antifriction means mounted on said frame and a pintle upstanding from said frame; and coupling means for mounting said understructure means to an article to be supported, including a tubular socket unit dimensioned to receive said pintle slidably and rotatably, antifriction bearing means mounted in said socket unit to contact the sidewall of said pintle and bear lateral thrust loads imposed on said understructure means, and axial thrust bearing means acting between the top end of said pintle and the confronting surface portion of said socket unit to accept substantially all of the vertical load imposed on said support arrangement, said socket unit including an elongated socket member having a lower collar portion, said socket unit further including a cup-like base element snugly telescopingly receiving said collar portion to definie an abutting double thickness of material radially outwardly of said antifriction bearing means for supporting said antifriction bearing means against said lateral thrust loads.

2. A rollable support arrangement comprising: understructure means including a frame, floor-engaging antifriction means mounted on said frame and a pintle rigidly upstanding from said frame; and coupling means for mounting said understructure means to an article to be supported, including a tubular socket member dimensioned to receive said pintle slidably and rotatably and an annular body of fused resin mounted in said socket and having a central bore for contactingly receiving said pintle and bearing lateral thrust loads in a noise-free manner, said body further having a second, downwardly opening bore coaxial with and of greater diameter and lesser axial extent than said central bore, said coupling means further including pintle retainer means mounted in said second bore for litmited axial movement relative to said socket member and for exposure to said pintle for resiliently gripping a perihperal portion thereof whereby to prevent accidental extraction of said pintle from said socket member.

3. A rollable support arrangement according to claim 2 wherein said second bore has an axial extent that is equal to a multiple of the thickness of said retainer means whereby to permit appreciable free axial movement of said pintle relative to said socket member for accommodating variations in the underlying floor and for promoting quiet operation.

4. A socket unit for mounting a caster unit to an article to be supported, said socket unit comprising: a tubular socket member dimensioned to receive a caster pintle slidably and rotatably; an annular body of fused fluorocarbon resin mounted in said socket member and having a central bore for contactingly receiving the caster pintle and bearing lateral thrust loads in a noise-free manner, said body further having a second, downwardly opening bore coaxial with and of greater diameter and lesser axial extent than said central bore; pintle retainer means mounted in said second bore for limited movement axially thereof and for exposure to the caster pintle for resiliently gripping a peripheral portion thereof whereby to prevent accidental extraction of the caster pintle from said socket member; and axial thrust bearing means, including an element of fluorocarbon resin located in the top end of said socket member for contactingly receiving the top end of the caster pintle whereby to accept substantially all of the vertical load imposed on the caster unit.

References Cited by the Examiner
UNITED STATES PATENTS

| | | | |
|---|---|---|---|
| 473,924 | 5/1892 | Hardenberg et al. | 16—38 |
| 687,838 | 12/1901 | Keiper. | |
| 1,232,688 | 7/1917 | Johnson | 16—43 |
| 1,771,788 | 7/1930 | Herold | 16—39 |
| 2,995,381 | 8/1961 | Melton et al. | |
| 3,059,318 | 10/1962 | Herbert et al. | |

JOSEPH D. SEERS, *Primary Examiner.*

DONLEY J. STOCKING, *Examiner.*